March 6, 1962 H. WAGNER ET AL 3,023,629
BOOSTER STEERING MECHANISM FOR MOTOR VEHICLES
Filed July 13, 1959 2 Sheets-Sheet 1

Inventors
HEINRICH WAGNER,
ERICH JABLONSKY
BY
ATTORNEY

March 6, 1962  H. WAGNER ET AL  3,023,629
BOOSTER STEERING MECHANISM FOR MOTOR VEHICLES
Filed July 13, 1959  2 Sheets-Sheet 2

Inventors
HEINRICH WAGNER,
ERICH JABLONSKY
BY
ATTORNEY

United States Patent Office 3,023,629
Patented Mar. 6, 1962

3,023,629
BOOSTER STEERING MECHANISM
FOR MOTOR VEHICLES
Heinrich Wagner and Erich Jablonsky, Schwaebisch Gmund, Germany, assignors to Zahnradfabrik Friedrichshafen, Aktiengesellschaft, Friedrichshafen, Germany
Filed July 13, 1959, Ser. No. 826,811
Claims priority, application Germany July 26, 1958
3 Claims. (Cl. 74—105)

This invention relates to booster steering arrangements and more particularly to a fluid pressure operated mechanism utilizing a double-ended cylinder operating individual steering linkages for each of a pair of front wheels.

A problem exists, particularly in the tractor field, where attachment of heavy equipment and the like is necessary for use in conjunction with vehicles or tractors. Such problem relates to the fact that most farm vehicles of the tractor type have a requirement for track gauge changes, i.e., the setting of the front wheels nearer or further away from each other for specific purposes. Hence, individual steering linkages are used. Under such conditions power booster devices of the prior art are not suitable.

Manually operated steering systems wherein a steering nut actuates a pair of opposed crank assemblies, each assembly being connected with a steering shaft, are known. In such constructions the cranks engage abutments on the steering gear nut. The steering gear nut and the corresponding steering worm are mounted between the crank, or they may be arranged in front of the steering gear if a sufficiently long connecting rod is used.

In the arrangement of the present invention, a double-acting booster piston is utilized operated by fluid pressure wherein the piston is articulated to each of the steering linkages through steering shafts by means of contra-rotating transmission elements. The effect achieved thereby combines the known characteristics of a manually operated steering system with those of a power boost system. A further feature of the present invention resides in the fact that the elements for transmitting force from the piston to the crank assemblies are of a type heretofore known in principle, but the arrangement is such that two connecting rods of the crank assemblies are compactly disposed side by side and connected to a bushing rotatively carried on a bearing pin fixed to the piston, wherein one of the connecting rods is integrally fixed to the bushing and the other is free to rotate thereon. Thus, the bushing serves as an inner bearing for one rod and an outer bearing for the other.

The construction overcomes the usual bearing looseness which occurs with a divided steering shaft, and canting or slanting of the connecting rod or of the bearing support is avoided because of the relatively broad bearing surface of the one connecting rod integrally fixed to the bushing and because of the second connecting rod being journalled on the first connecting rod bushing.

Also, the construction permits housing of the connecting rod bearing pin directly on the piston in a small space circumscribed by the diameter of the cylinder and compactness is effected even though the connecting rod bearing pin may be made large enough to be strong for all practical purposes.

From the above general description, it will be apparent that the objects of the invention are to provide a rugged and compact mechanism for actuating both shafts of a divided steering shaft device in a manner which will balance the forces acting on the shafts while at the same time keep the force receiving components in proper alignment and in long-time operation with a minimum of wear.

A detailed description of the invention will now be given in conjunction with the appended drawing in which.

Figure 1:
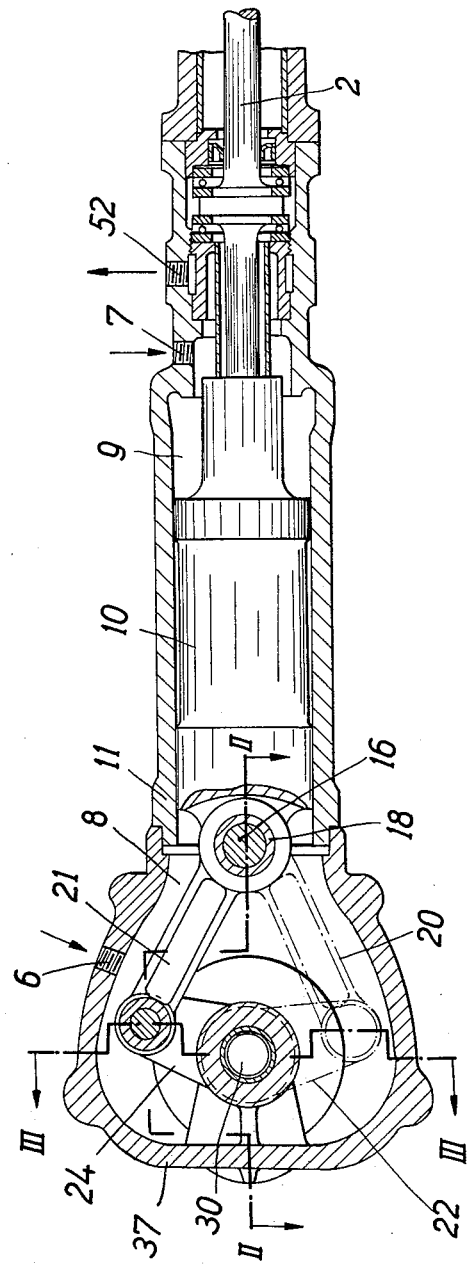
FIG. 1 shows the cross-section of a steering mechanism illustrating the novel arrangement of the invention.

Referring now to the drawing, a steering rod 2 is illustrated which will be understood to carry a steering wheel at its outer end, the steering wheel not being shown. Rotation of the rod 2 in either direction controls fluid pressure to either of the chambers 8 or 9 of a double-acting pressure cylinder 11. Fluid pressure may have access through the respective ports 6 and 7 and valve control along conventional methods may be utilized. The valve control arrangement does not form part of the present invention, and accordingly, is not shown herein.

A double-acting piston 10 is reciprocal in cylinder 11, which piston carries at its front end a bearing pin 16 which will be observed to be supported between a pair of parallel cheeks integral with the front end of the piston and protruding therefrom. Thus, the bearing 16 is strongly supported between the cheeks. Carried on the bearing 16 and freely rotative thereon is a bushing 18, which bushing supports the ends of a pair of connecting rods 20 and 21. The connecting rod 20 is integrally fastened to the bushing 18 as by welding, while the connecting rod 21 is freely rotative on the bushing.

By integrally attaching one of the connecting rods 20 to the bushing 18, the bearing surface of the rod 20 is increased to cover the whole area of the bore of the bushing. As a result of this, tilting, or shifting to an oblique position of the bushing in relation to the bearing pin 16 as a result of the obliquely acting forces of the connecting rods, is prevented.

In order to achieve an even wear of the bearing surfaces of the rods, the two bearing surfaces must be made of equal size, i.e., the bearing surface of the bushing on the pin 16 (=length of bushing×diameter of the pin 16) is equal to the bearing surface of the bore of rod 21 on the bushing (=half the length of the bushing×outside diameter of the bushing).

Thus, bearing surfaces of the smaller ends of the rods 20 and 21 are advantageously made equal to each other; namely: half of the surface of the bore of the one connecting rod 21 rotating freely on the bushing 18 is equal to half of the surface of the bore of bushing 18″ which engages pin 16, for force exerted in either direction.

Figure 2:
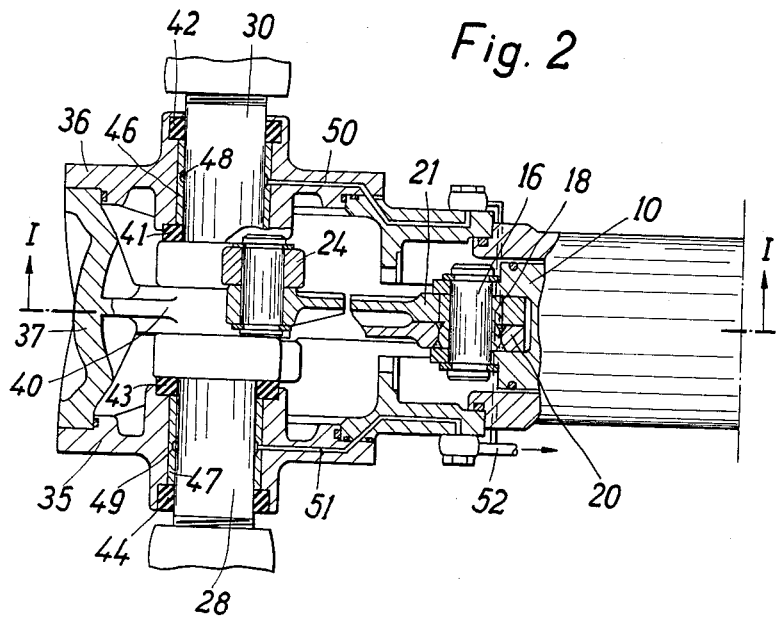
FIG. 2 is a section through 2—2 of FIG. 1 drawn to an enlarged scale.
Figure 3:
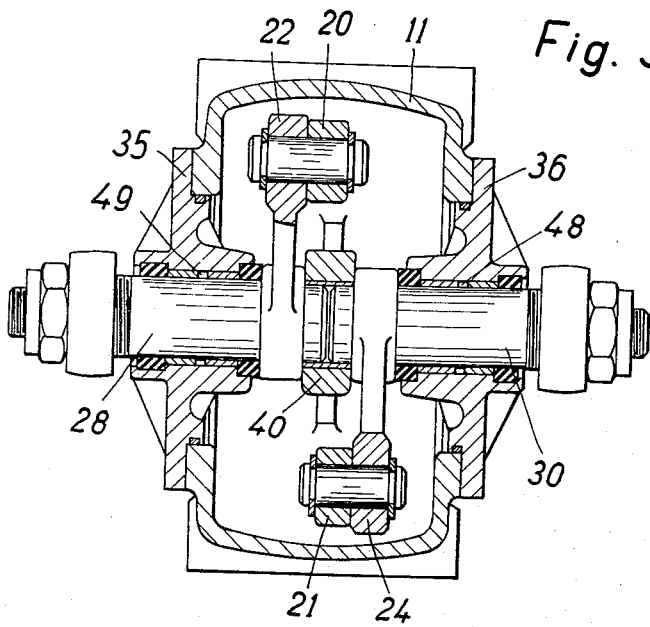
FIG. 3 is a section on the line 3—3 of FIG. 1 drawn to an enlarged scale.

A crank arm 22 is pivoted to connecting rod 20 while a crank arm 24 is pivoted to connecting rod 21. Crank arm 22 is secured to steering shaft 28 and crank arm 24 is secured to steering shaft 30. As shown, the cranks are arranged for contra-rotation. The steering shafts 28 and 30 pass through suitable bearing sleeves 47 and 46, respectively, carried in respective housing flanges 35 and 36, which flanges close openings in the sides of a ring-like housing 37, which ring-like housing is bolted to the cylinder 11 or otherwise suitably fastened thereto. As best seen on FIG. 3, the ends of steering shafts 28 and 30 approach each other inwardly in a central portion of housing 37 and are supported in a centrally located bearing 40 which, as will be noted in FIG. 2, is integrally cast with the interior of housing 37 and extends thereinto. Further, the steering shafts 28 and 30 are provided with suitable gaskets such as 41, 42, 43, and 44 for the purpose of retaining oil under pressure which exists in the housing 37 at the time that fluid pressure is passed into the chamber 8. In fact, the composite housing comprising housing 37 and flanges 35 and 36 actually form chamber 8 at the end of the cylinder 11 and it will be noted that the ingress pressure port 6 is a bore cut through the wall of the housing 37.

The bearing sleeves are provided with grooves such as 48 and 49, which connect with respective channels 50 and 51 that lead to a return pipe 52, as best seen on FIG. 2. It will be understood that the return pipe 52 leads to an oil reservoir and the arrangement of the grooves and bores takes care of oil leakage past gaskets 41 and 43.

It will be observed from the foregoing description that the distribution of load on the steering shafts is balanced owing to the support of the pillow block or bearing 40 and that the entire mechanism is made exceedingly small and compact by virtue of the arrangement, in the housing 37, of the crank shafts, crank, and connecting rods and also by utilization of the housing 37 as a pressure chamber for the piston. Further, a very important feature will be noted in that the axes of the steering shafts 28 and 30 as well as the axis of the piston all lie in the same plane and meet at the same point. By such arrangement of components the distribution of forces exerted by these several members is balanced and thus avoidance of any bending or slanting of any of the components is effected.

Having thus described our invention, we are aware that various changes may be made therein without departing from the spirit of the invention and, accordingly, we do not seek to be limited to the precise illustration herein given except as set forth in the following claims.

We claim:

1. A power boost steering mechanism comprising a cylinder, a piston reciprocal in said cylinder, a pair of co-axial steering shafts having respective crank arms rotative about the axis of said shafts, a connecting rod being articulated between each crank arm and said piston, said crank arms being disposed for contra-rotation upon motion of said piston, said connecting rods having a common pivotal axis means articulating them to said piston, said common axis being substantially normal to the axis of said piston, and in the plane of said piston axis, said axis of said shafts being in said plane.

2. A power boost steering mechanism comprising a cylinder, a piston reciprocal in said cylinder, a pair of steering shafts having respective crank arms, a connecting rod being articulated between each crank arm and said piston, said crank arms being disposed for contra-rotation upon motion of said piston, said piston carrying a bearing, a bushing freely rotative on said bearing, said connecting rods being connected to said bushing, one of said connecting rods being fixed to said bushing and the other being freely rotative thereon, said connecting rods having a common pivotal axis means articulating them to said piston, said common axis being substantially normal to the axis of said piston, and in the plane of said piston axis.

3. A power boost steering mechanism comprising a cylinder, a piston reciprocal in said cylinder, a pair of steering shafts having respective crank arms, a connecting rod being articulated between each crank arm and said piston, said crank arms being disposed for contra-rotation upon motion of said piston, said connecting rods having a common pivotal axis means articulating them to said piston, said common axis being substantially normal to the axis of said piston, said steering shafts being axially aligned, the axis of said piston intersecting the axis of said steering shafts.

References Cited in the file of this patent

UNITED STATES PATENTS

| | | |
|---|---|---|
| 660,679 | Chauveau | Oct. 30, 1900 |
| 1,225,737 | Serban | May 8, 1917 |
| 1,701,439 | Canfield | Feb. 5, 1929 |
| 1,908,008 | Bethenod | May 9, 1933 |
| 2,941,514 | Jablonsky | June 21, 1960 |

FOREIGN PATENTS

| | | |
|---|---|---|
| 1,727 | Great Britain | May 12, 1873 |
| 1,022,851 | France | Mar. 11, 1953 |
| 63,918 | France | Oct. 14, 1955 |